United States Patent
Engbersen et al.

(10) Patent No.: US 7,739,474 B2
(45) Date of Patent: Jun. 15, 2010

(54) METHOD AND SYSTEM FOR UNIFYING MEMORY ACCESS FOR CPU AND IO OPERATIONS

(75) Inventors: Antonius Paulus Engbersen, Feusisberg (CH); Julian Satran, Atlit (IL); Edi Shmueli, Haifa (IL); Thomas Basil Smith, III, Wilton, CT (US)

(73) Assignee: International Business Machines Corporation, Armonk, NY (US)

( * ) Notice: Subject to any disclaimer, the term of this patent is extended or adjusted under 35 U.S.C. 154(b) by 660 days.

(21) Appl. No.: 11/348,805

(22) Filed: Feb. 7, 2006

(65) Prior Publication Data

US 2007/0226450 A1 Sep. 27, 2007

(51) Int. Cl.
*G06F 9/26* (2006.01)
(52) U.S. Cl. ...................................... 711/203
(58) Field of Classification Search ................ None
See application file for complete search history.

(56) References Cited

U.S. PATENT DOCUMENTS

| | | | |
|---|---|---|---|
| 4,550,368 A * | 10/1985 | Bechtolsheim | 711/206 |
| 5,301,287 A * | 4/1994 | Herrell et al. | 711/202 |
| 6,647,472 B2 * | 11/2003 | Atkinson et al. | 711/158 |
| 6,681,346 B2 | 1/2004 | James et al. | |
| 7,325,233 B2 * | 1/2008 | Kuck et al. | 718/103 |
| 7,376,949 B2 * | 5/2008 | Lowell et al. | 718/1 |
| 2003/0088604 A1 | 5/2003 | Kuck et al. | |
| 2005/0144422 A1 * | 6/2005 | McAlpine et al. | 711/206 |
| 2006/0288130 A1 * | 12/2006 | Madukkarumukumana et al. | 710/22 |

* cited by examiner

*Primary Examiner*—Tuan V Thai
*Assistant Examiner*—Duc T Doan

(57) ABSTRACT

A system and method for unifying access to a physical memory by operations using virtual addresses of the same virtual address space are provided. The operations may be generated by at least one central processing unit (CPU operations) and/or by at least one IO device (IO operations). The system may include a bus arranged to transfer data and virtual addresses of the same virtual address space from the central processing unit (CPU) and the IO device to a unified memory management unit (UMMU), a unified memory management unit (UMMU) arranged to translate the virtual addresses to physical addresses, and to protect the physical memory from illegal access attempts of the CPU operations and the IO operations. The system may further include a memory controller arranged to manage access to the physical memory. The access is done by using physical addresses.

3 Claims, 4 Drawing Sheets

METHOD AND SYSTEM FOR UNIFYING MEMORY ACCESS FOR CPU AND IO OPERATIONS

FIELD OF THE INVENTION

The present invention relates generally to the field of computer and processor architecture. In particular, the present invention relates to a method and system for unifying memory access for CPU (central processing unit) and IO operations.

BACKGROUND OF THE INVENTION

The architecture of most current personal computer (PC) systems, from desktop to server, may be conceptually and schematically illustrated by FIG. 1, to which reference is now made.

PC system 10 typically includes memory 20, which may be embedded within one or more processing units 12, or may be separate therefrom. Processing units 12 are typically coupled with IO devices 14[1]-14[i] via one or more IO buses 16, e.g., peripheral component interconnect (PCI) buses. Some or all of the IO devices may be coupled with an IO bridge 17, which may be coupled with IO bus 16. Optionally, in order to make the connection between processing units 12 and IO devices 14[1]-14[i] quicker, PC system 10 may also include one or more components, e.g., a north bridge unit 18, that communicate with the processing units 12 and control the interaction with memory 20, and the IO buses 16.

Processing unit 12 typically includes a Central Processing Unit (CPU) 26 that typically refers to virtual memory addresses or space, which get translated by the memory management unit (MMU) 24 into physical addresses. The physical address is typically used for cache 22 (although some processor architectures use virtual addresses for cache access) and access to memory 20. In addition to 'virtual to physical' translation information, the MMU 24 typically contains memory protection information used to grant memory access to its owner, e.g., to the thread or process that requested the memory access. For example, system pages may typically be read only by a privileged process, such as by an operating system, or by another privileged process, while user space processes are typically allowed to access only their own memory pages.

In the computer architecture described in FIG. 1, there is substantially no memory protection for Direct Memory Access (DMA) done from a DMA-enabled IO device 14[1]-14[i], whether the IO device is directly coupled with IO bus 16 or whether the IO device is coupled with IO bridge 17. In both cases, IO device 14[1] and 14[i] communicate via DMA engine 28 to directly access memory 20.

As shown in FIG. 1, IO bus 16 is coupled with memory 20 through north bridge unit 18 without the involvement of CPU 26 and MMU 24. Therefore, IO devices 14[1]-14[i] that typically use physical addresses have access to all memory space, both to privileged memory space, such as the memory space of the operating system, and to non-privileged memory space, such as the memory space of applications running on PC system 10. Any mis-configuration of IO devices or hostile configuration of IO devices 14 may compromise the stability and integrity of PC system 10 by allowing the DMA engines 28 of IO device 14[1]-14[i] to freely access any region in memory 20 of system 10.

Furthermore, in DMA based IO operations that use physical addresses, the operating system is typically required to access the operating system page tables to find the physical addresses of the pages involved in the operation. To ensure that the required pages are present in the memory, multiple page faults may be issued to retrieve them. Since a continuous range of virtual addresses spanning multiple pages may be mapped to a non-contiguous range of physical pages, the DMA operation is often broken into multiple page-sized operations. More recent DMA engines or controllers attempt to support DMA operations to a non-contiguous range of physical pages, but in both cases, the physical pages involved in the DMA operation cannot be relocated or evicted from the memory while the operation is in progress, to avoid overwrite or read operations of pages that belong to other processes. To ensure the safe operation of the system, all pages involved in the DMA operation are required to be pinned before the operation begins and later unpinned once it is completed. For non-blocking IO operations, the pages are required to remain pinned even when the process crashes, as long as the DMA operation is still in progress.

When systems use a hypervisor (not shown) to manage sharing of the processor by multiple operating system instances, safe DMA operation is an even harder target. In such systems, each operating system instance is typically allocated a subset of the physical memory that it manages on behalf of its processes. These instances cannot be trusted for pinning their pages when performing an IO operation. Therefore, when any of the instances crashes, it is substantailly impossible for the hypervisor to determine which page is involved in an ongoing DMA operation and which page can be safely allocated to a new operating system instance.

The following two attempts to solve this problem are equally ineffective and have problems related to their complexity and performance. The first attempt is to perform the IO operations through the hypervisor itself, which results in a complicated design of the hypervisor, which also requires modification to the hosted operating systems. The second attempt is to perform the IO operations through a dedicated memory partition, but in this case the hypervisor is still required to manage the allocation of pages in that partition.

In more recent systems the memory is better secured using a specialized virtual address space for IO, typically referred to as the "IO address space", and having IO devices use that space for their DMA operations. An exemplary system is illustrated in FIG. 2, to which reference is now made. System 30 includes one or more 10 Memory Management Units (IOMMU) 32. Some or all of IO devices 14[1]-14[i] may include a local IOMMU 32. Alternatively, two or more IO devices 14[1]-14[i] may share a common IOMMU 32. Each IOMMU 32 typically uses translation and protection tables that hold the mapping between virtual addresses at the IO address space and their corresponding physical addresses. Before an IO operation can take place, the operating system updates the translation tables for the IOMMU, so the operation, e.g., DMA operation, targets the correct physical pages.

System 30 has a few problems. First, the operating system has to manage two sets of translation tables, one for the processes that are executed on the CPU, for mapping their virtual address space to physical memory (to be used by MMU 24), and the second for IO, for mapping the IO address space to physical memory (to be used by IOMMU 32). The operating system is always required to keep the tables in sync. For example, if a process virtual to physical mapping is modified, then the corresponding IO translation tables are required to be modified as well so the DMA operation will access the right set of physical pages. Keeping the tables synchronized raises difficulties such as race conditions issues, complicates memory management and IO handling code in the operating system, and may adversely affect the performance of IO operations. The problem is even more complicated if IOMMU 32 caches recent translation entries to speed-up translation. In this case, entries at the IOMMU TLB (translation lookaside buffer, not shown in FIG. 2) are required to be invalidated whenever a process mapping is changed or a new IO operation begins. Second, the IO address space, unlike the processes virtual address space, is not protected, which means that potentially any IO device can access any region at the IO address space and thus access any region of the physical memory which is mapped by the IO translation tables. Solutions to this problem are typically handled by complex layers of software. Third, there is no mechanism for IOMMU 32 to handle translation exceptions, e.g., when a valid translation for an I/O virtual address is not found at the I/O page tables. It is then the responsibility of the operating system to ensure that valid translations for ongoing IO operations exist.

SUMMARY OF THE INVENTION

Embodiments of the present invention may provide a method and system for unifying memory access for CPU and IO operations.

According to a first aspect of the present invention there is provided a system for unifying access to a physical memory by operations using virtual addresses of the same virtual address space. The operations may be generated by at least one central processing unit (CPU operations) and/or by at least one IO device (IO operations). The system may include a bus arranged to transfer data and virtual addresses of the same virtual address space from the central processing unit (CPU) and the IO device to a unified memory management unit (UMMU), a unified memory management unit (UMMU) arranged to translate the virtual addresses to physical addresses, and to protect the physical memory from illegal access attempts of the CPU operations and the IO operations. The system may further include a memory controller arranged to manage access to the physical memory. The access is done by using physical addresses.

According to a second aspect of the present invention there is provided a computer-implemented method for unifying access to a physical memory by operations using virtual addresses of the same virtual address space, said operations are generated by at least one central processing unit (CPU operations) and/or by at least one IO device (IO operations). The method may include detecting read or write references to the virtual addresses of the same address space generated by the CPU operations and/or the IO operations, determining whether a translation of the virtual addresses is available and whether the read or write references do not violate any access rights, translating the virtual addresses to physical addresses, and accessing to the physical memory according to the translated physical addresses.

Also provided in accordance with another embodiment of the present invention, a computer software product, including a computer-readable medium in which computer program instructions are stored, which instructions, when read by a computer, cause the computer to perform the method described above.

BRIEF DESCRIPTION OF THE DRAWINGS

Embodiments of the present invention will now be described, by way of examples only, with reference to the accompanying drawings in which.

DESCRIPTION OF EMBODIMENTS OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have realized that in order to address the problems mentioned above in the "Background of the Invention" section, to improve the current art and to simplify the way 10 is handled in computer systems, IO operations, also referred to hereinafter as direct memory access (DMA) operations, may use virtual addresses of the same address space as processes being executed by the CPU. Applicants have further realized that the same memory management unit, hereinafter referred as a "unified memory management unit" (UMMU), may be used to unify the CPU, e.g., processes and IO, e.g., DMA operations, path to memory, and to provide translation and protection services uniformly to both the CPU and IO. Therefore, translation and protection components that are CPU or IO specific, such as traditional MMU for CPU operations, or IOMMU for IO operations, may be disabled or removed. Accordingly, controllers of the CPU and the IO devices may use virtual addresses of the same address space to access the system bus, and these addresses may be used in the entire path of the operation to access the memory, as will be described in detail below.

Figure 1:
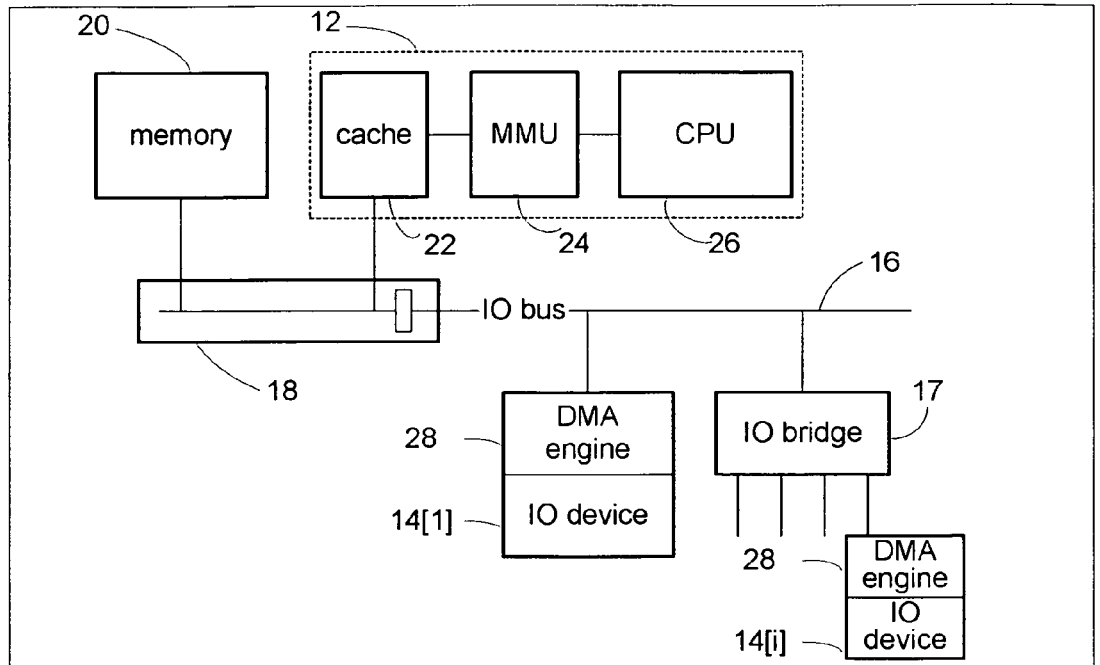
FIG. 1 is a schematic block diagram of a prior art computer system.
Figure 2:
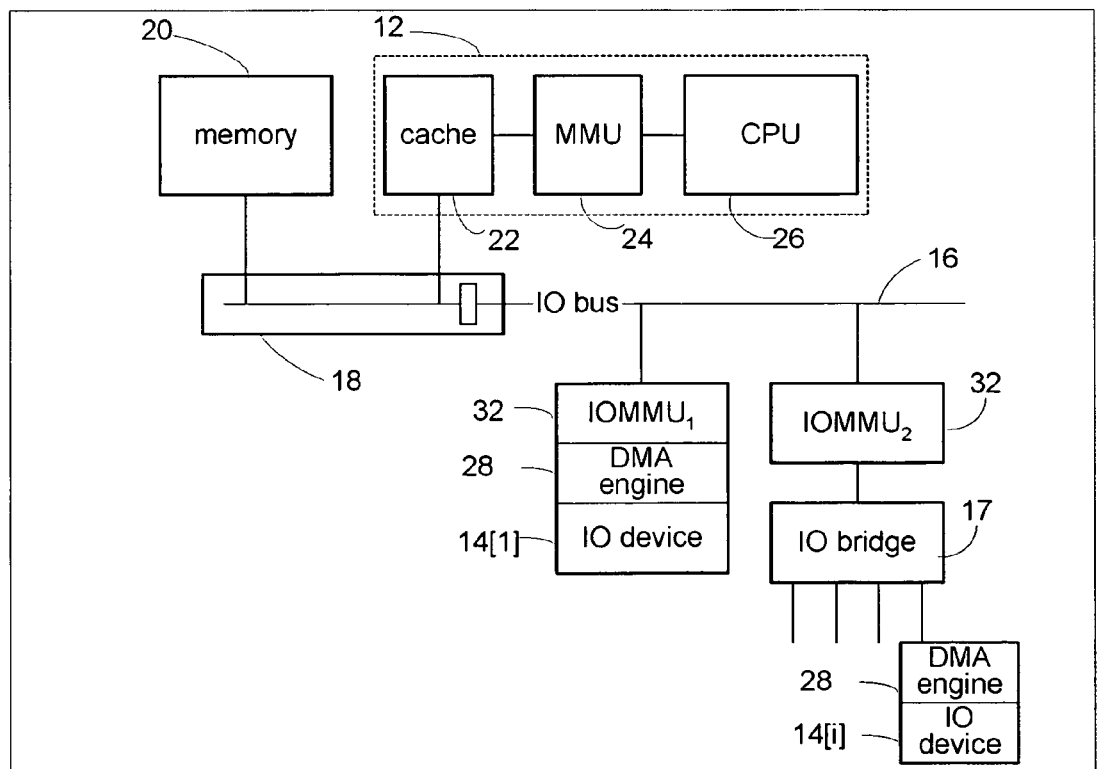
FIG. 2 is a schematic block diagram of a prior art computer system with IO Memory Management Units (IOMMU)
Figure 3:
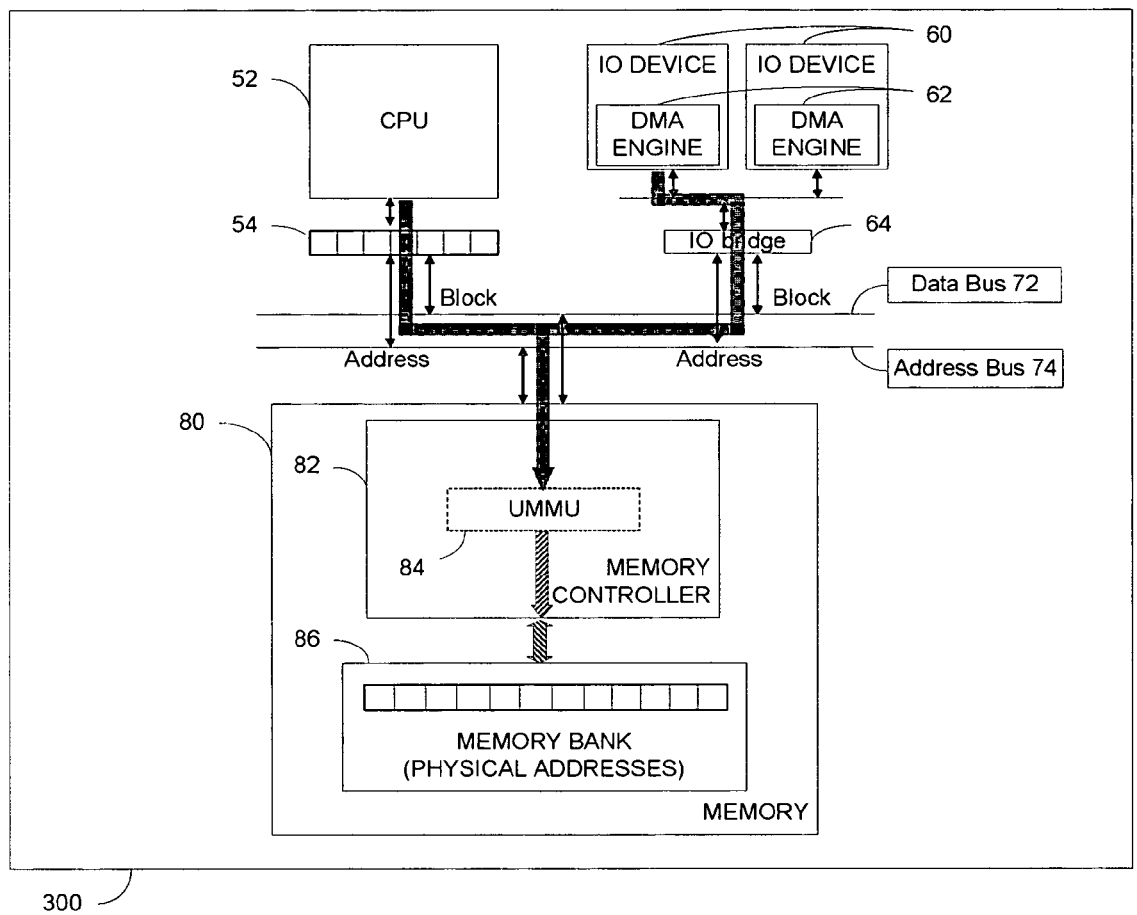
FIG. 3 is a schematic block diagram illustrating a logical view of a system for unifying memory access for CPU and IO operations, in accordance with an embodiment of the present invention.

Reference is now made to FIG. 3, which is a schematic block diagram illustrating a logical view of a system 300 for unifying memory access for CPU and IO operations, in accordance with an embodiment of the present invention. Before describing system 300 in detail, it should be noted that some of the elements of system 300 may be similar to the elements described in FIGS. 1 and 2. For example, system 300 may include the same CPUs, caches and memory that are described in FIGS. 1 and 2. However, for clarification purposes, these elements are described hereinbelow.

System 300 may include one or more central processing units (CPU) 52. Cache 54 which may be coupled with or embedded in CPU 52, may store copies and virtual addresses of the data most frequently used by CPU 52. CPU 52 may be connected via cache 54 to an IO bus, logically separated to data bus 72 to communicate data to CPU 52, and to address bus 74 to communicate virtual addresses to CPU 52. It should be noted that in some architecture configurations the IO bus may be designed such that some physical communication lines are used to transfer data and other lines are used to transfer virtual addresses.

System 300 may also include IO devices 60 that may be coupled via an IO bridge 64 to the IO bus. DMA engines 62 may manage the direct memory access (DMA) operation of IO devices 60. System 300 may further include physical memory 80. Memory 80 may include a memory bank 86, e.g., an array of bytes to hold the required information for the operation of computer system 300. Memory 80 may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Memory controller 82 may manage the access to memory 80 and its internal operations. Memory controller 82 may include a unified memory management unit (UMMU) 84 that may translate the virtual addresses that may be used to access memory 80 into physical addresses that may be used by memory 80, and to protect memory 80 as will be described in detail below. As indicated in FIG. 3 by the solid arrows, the path for CPU and IO (from CPU 52 and DMA engines 62, respectively), to UMMU 84 may be done by using virtual addresses of the same address space, and the path from UMMU 84 to the memory bank 86, marked by dashed arrows, may be done using physical addresses.

In accordance with embodiments of the present invention UMMU 84 may uniformly handle address translation and protection for both CPU 52 and IO devices 60. Accordingly, operations such as pinning and un-pinning of physical pages of memory 80 may become a cost optimization operation with substantially no logical side effects, because memory controller 82 may ensure that a physical block which corresponds to a virtual address that is read or written, by either CPU 52 or IO device 60, may be present at memory 80, for the operation to successfully complete. Furthermore, in accordance with embodiments of the present invention, the location of a physical page in memory 80 which is involved in a DMA operation may be changed during the on-going DMA operation without side effects, e.g., data corruption or performance delays.

Furthermore, a hypervisor (not shown) which may manage the sharing of a processor by multiple operating system instances may allocate each instance a private virtual address space, e.g., a virtual segment for IO operations, which may be managed by UMMU 84. Accordingly, if the instance crashes, any incomplete IO operation it had performed prior to the crash may still be targeted at that virtual address space. The hypervisor may thus safely allocate new virtual address spaces, e.g., new segment IDs, for new operating system instances. In accordance with this embodiment of the invention, the address spaces cannot be corrupted by IO operations that are not allowed to access that address space, even after a crash of an operating system instance, since UMMU 84 may uniformly protect each address space.

It should be noted that in accordance with some embodiments of the present invention, all components of system 300 may use virtual addresses of the same address space to access memory 80. Therefore, the overhead of maintaining and synchronizing two sets of translation tables, one for the processes, for mapping their virtual address space to physical memory, to be used by the MMU of the CPU, and the second for IO, for mapping the IO address space to physical memory, to be used by IOMMU, is eliminated. Therefore, the memory management and IO handling code in the operating system may be simplified.

In accordance with embodiments of the present invention the need for complex layers of software or hardware solutions to manage and protect the IO address space may be eliminated, because IO or DMA operations use the same virtual address space as the processes executed by the CPU, and thus the same translation and protection mechanisms may be used for both IO and CPU.

Instead of using multiple translation and protection mechanisms for CPU and IO, the single translation and protection mechanism, which may be managed by UMMU 84, may unify the CPU and IO path to memory and may eliminate the complexity involved in maintaining consistency between multiple cached translations.

Implementing UMMU 84 at the memory controller 82 may relax size constraints that are typical, for example, for MMUs that are located at the CPU. Thus, larger translation caches (TLBs) may be used, and more sophisticated logic may be implemented for the unified memory management unit, e.g., page perfecting operations may be done by considering not only recent CPU page references, but also IO page references.

Figure 4:
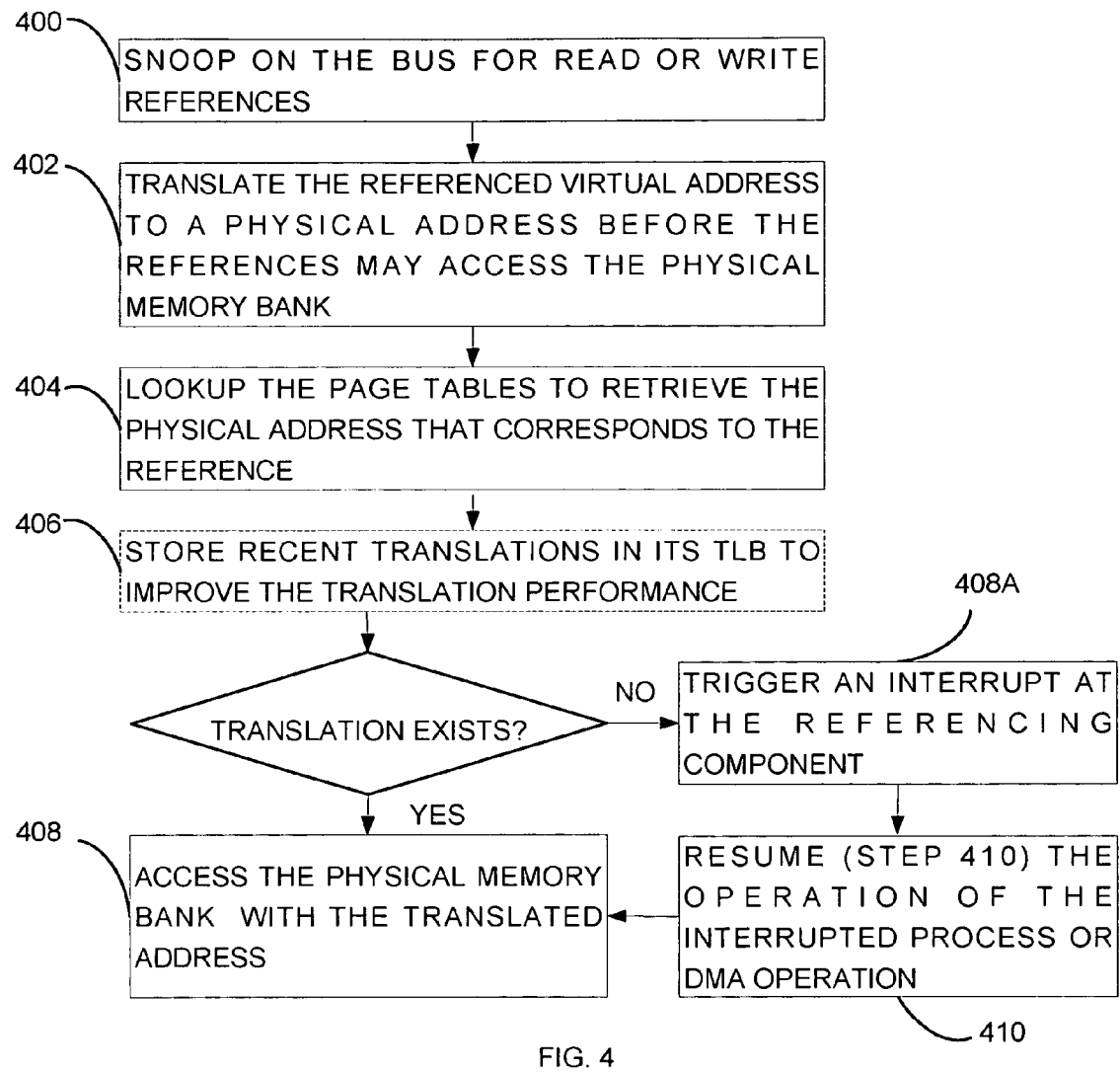
FIG. 4 is a flow chart diagram of an exemplary method for accessing memory in accordance with an embodiment of the present invention.

Reference is now made to FIG. 4, which is a flow chart diagram of an exemplary method for accessing memory in accordance with an embodiment of the present invention. The following exemplary method may be implemented in an x86-like system, in which the addressing schema is composed of a segment identifier and a segment offset. The number of segments a process can reference at any given time is defined specifically for each type of CPU, and it depends on the number of segment registers in the CPU. This exemplary method may also be implemented in a PowerPC-like system, in which case the addressing schema is of a single large, global virtual address space that is shared by all processes. In PowerPC-like design, an operating system may allocate non-overlapping segments in the global address space. Accordingly, the virtual address space of each process is also divided into non-overlapping virtual segments. The mapping from the process virtual segments to the global virtual address space may be stored in tables that are managed by the operating system. When a process references a virtual address, the segmentation unit in the CPU uses these tables to calculate the global-virtual address of the reference. However, from the perspective of the memory controller and the UMMU, both systems may be handled in the same way, as will be described below.

Memory controller 82 may snoop or detect (step 400) on the bus read or write references to segments in the x86-like system and for read or write references to global-virtual addresses in the PowerPC-like system. These references may be generated by processes executing on the CPU, or by DMA engines servicing IO requests from the IO devices. In both cases, the UMMU 84 may be required to translate (step 402) the referenced virtual address to a physical address before the references may access the physical memory bank.

The translation information may be stored in page tables at the physical memory bank. The operating system or hypervisor may be responsible for managing these page tables. UMMU 84 may lookup (step 404) the page tables to retrieve the physical address that corresponds to the reference. Optionally, the memory controller may store (step 406) recent translations in its TLB to improve the translation performance.

When the physical address is successfully found in the page tables (or when the translation already exists in the TLB), the physical memory bank may be accessed (step 408)

with that address. For a read operation, the memory bank may respond with a block of data on the data bus. For a write operation, it may copy the written block of data from the data bus into the proper physical location.

The lookup in the page table may result in a failure for at least the following reasons: the page may not be in the memory but may be present in the swap area, e.g., disk; the access type may violate the page access rights, e.g., write to a read-only page, etc. In these cases the memory controller may trigger (step 408A) an interrupt at the referencing component, e.g., the CPU or IO device, as will be described below, to indicate that it is unable to translate the address. In this case, special registers at the memory controller may save the faulting virtual address and the error code describing the reason the translation failed, e.g., page in swap, page access-right violation, etc.

When the interrupt handling is completed, e.g., the missing page is swapped-in and the page table is updated, etc., the operating system may resume (step 410) the operation of the interrupted process or DMA operation. When the process or DMA operation access the memory, a valid translation is found, and the physical memory bank may be successfully accessed (step 408).

Figure 5A:
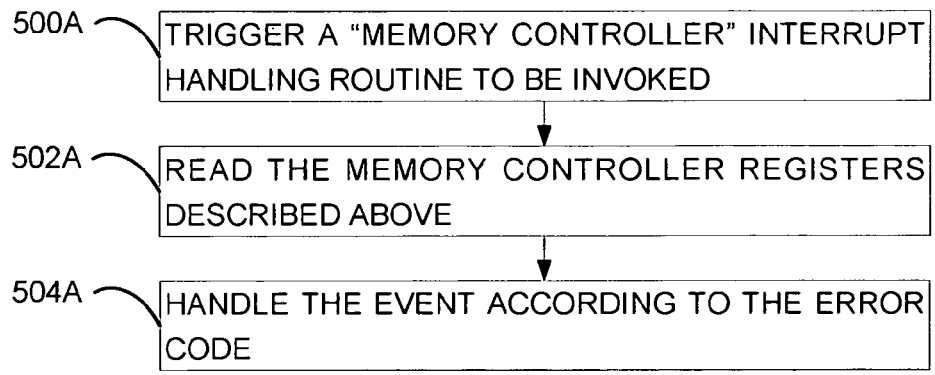
FIG. 5A is a flow chart diagram of handling translation exceptions when the referencing component is a CPU, in accordance with an embodiment of the present invention.

Reference is now made to FIG. 5A, which is a flow chart diagram of handling translation failure when the referencing component is a CPU, in accordance with an embodiment of the present invention. In this case, interrupt may be triggered (step 500A) at the CPU causing a "memory controller" interrupt handling routine to be invoked. The "memory controller" interrupt may read (step 502A) the memory controller registers described above and handle (step 504A) the event according to the error code, e.g., swap-in the page and update the page tables, or terminate the process in case of access-right violation, etc.

Figure 5B:
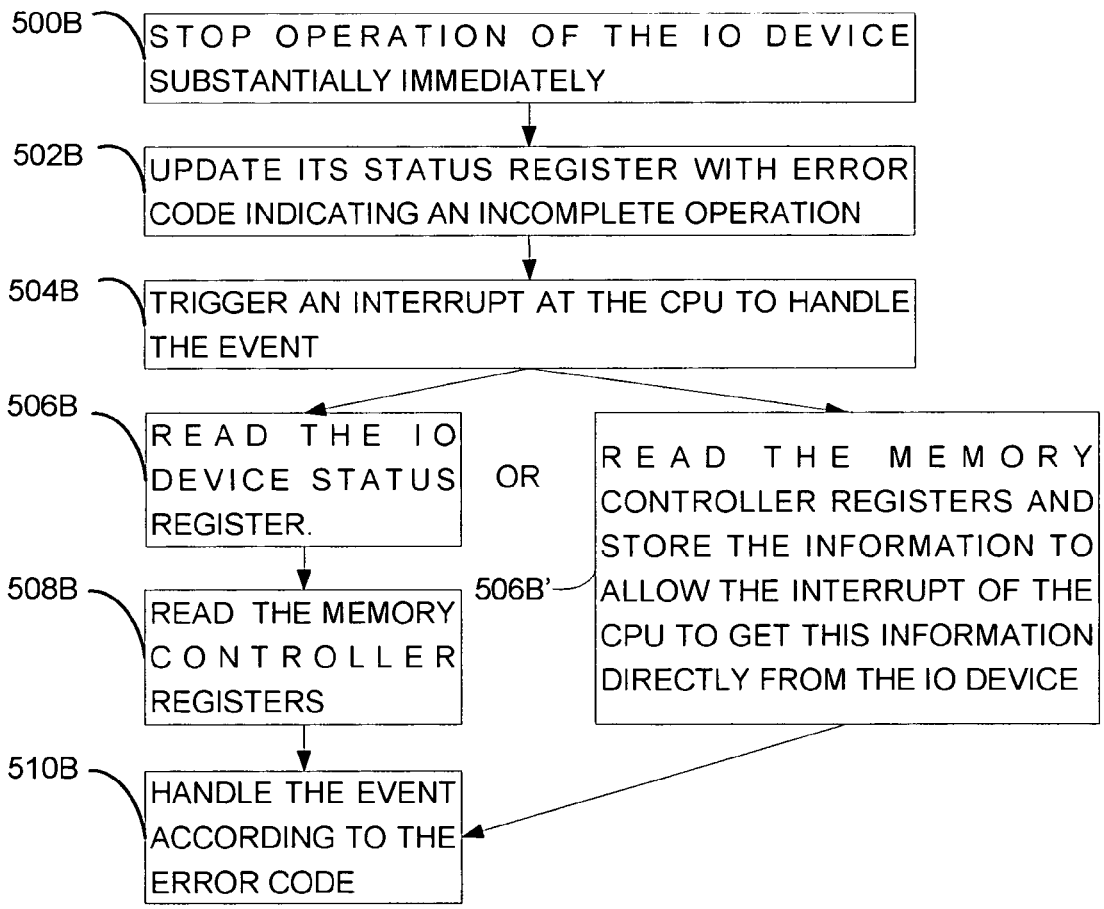
FIG. 5B is a flow chart diagram of handling translation exceptions when the referencing component is an IO device, in accordance with an embodiment of the present invention.

Reference is now made to FIG. 5B, which is a flow chart diagram of handling translation failure when the referencing component is an IO device, in accordance with an embodiment of the present invention. In this case, the device may stop (step 500B) its operation substantially immediately, and update (step 502B) its status register with error code indicating an incomplete operation. The IO device may then trigger (step 504B) an interrupt at the CPU to handle the event. The interrupt handling routine at the CPU may read (step 506B) the IO device status register. Then, it may read (step 508B) the memory controller registers and handle (step 510B) the event according to the error code. In accordance with another embodiment of the present invention, the IO device itself may read (step 506B') the memory controller registers and store the information, e.g., faulting virtual address and error code, to allow the interrupt handling routine at the CPU to get this information directly from the IO device, not from the memory controller.

In the description above, numerous specific details have been set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

Software programming code that embodies aspects of the present invention is typically maintained in permanent storage, such as a computer readable medium. In a client-server environment, such software programming code may be stored on a client or server. The software programming code may be embodied on any of a variety of known media for use with a data processing system. This includes, but is not limited to, magnetic and optical storage devices such as disk drives, magnetic tape, compact discs (CD's), digital video discs (DVD's), and computer instruction signals embodied in a transmission medium with or without a carrier wave upon which the signals are modulated. For example, the transmission medium may include a communications network, such as the Internet. In addition, while the invention may be embodied in computer software, the functions necessary to implement the invention may alternatively be embodied in part or in whole using hardware components such as application-specific integrated circuits or other hardware, or some combination of hardware components and software. For example, UMMU 84 may be embodied in computer software or, alternatively, in part or in whole using hardware components.

The present invention is typically implemented as a computer program product, comprising a set of program instructions for controlling a computer or similar device. These instructions can be supplied preloaded into a system or recorded on a storage medium such as a CD-ROM, or made available for downloading over a network such as the Internet or a mobile telephone network.

Improvements and modifications can be made to the foregoing without departing from the scope of the present invention.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:
1. A method for unifying access to a physical memory, the method comprising:
   detecting a first read or write operation directed to the physical memory, wherein the first operation provides a virtual address and is generated by a central processing unit (CPU) or an input/output (I/O) device;
   translating the virtual address to a physical address, wherein the CPU and the I/O device share a same virtual address space such that the virtual address is translated using a same set of page tables regardless of whether the first operation is generated by the CPU or the I/O device;
   accessing the physical memory according to the physical address, wherein address translation and memory protection are performed atomically for both the CPU and the I/O device such that registering or pinning of memory pages accessed by the CPU or the I/O device is not required to prevent data corruption or performance delays;
   determining whether the first operation violates any access rights, wherein translation of the virtual address to the physical address is not performed due to determining that a translation of the virtual address is not available or that the first operation violates an access right;
   triggering a first interrupt at the CPU, in response to failing to translate the virtual address to the physical address, wherein a first interrupt handling routine is invoked at the CPU, and wherein the first interrupt handling routine manages the first interrupt for failing to translate the virtual address to the physical address, wherein the first operation is generated by the I/O device; and
   triggering a second interrupt at the I/O device, in response to failing to translate the virtual address to the physical address, wherein a second interrupt handling routine is invoked at the I/O device, and wherein the second interrupt handling routine saves the virtual address and a reason for failing to translate the virtual address to the physical address in one or more registers of the I/O device from memory controller registers.

2. The method of claim 1, wherein the translating comprises storing a translation of the virtual address in a local translation cache.

3. The method of claim 1, wherein the first interrupt handling routine retrieves the virtual address and the reason for failing to translate the virtual address to the physical address directly from the registers of the I/O device.

* * * * *